(12) United States Patent
Higgs (10) Patent No.: US 8,658,119 B2
(45) Date of Patent: Feb. 25, 2014

(54) PRODUCTION AND/OR RECOVERY OF PRODUCTS FROM WASTE SLUDGE

(75) Inventor: Robert Philip Higgs, St. Austell (GB)

(73) Assignee: Calcitech Synthetic Minerals Ltd., Geneva (CH)

( * ) Notice: Subject to any disclaimer, the term of this patent is extended or adjusted under 35 U.S.C. 154(b) by 0 days.

(21) Appl. No.: 13/517,856

(22) Filed: Jun. 14, 2012

(65) Prior Publication Data

US 2012/0328497 A1 Dec. 27, 2012

Related U.S. Application Data

(63) Continuation of application No. PCT/GB2010/002267, filed on Dec. 14, 2010.

(30) Foreign Application Priority Data

Dec. 14, 2009 (GB) .................................. 0921820.7

(51) Int. Cl.
 *C01F 11/18* (2006.01)
(52) U.S. Cl.
 USPC ........................................................ 423/432
(58) Field of Classification Search
 USPC ........................................................ 423/432
 See application file for complete search history.

(56) References Cited

U.S. PATENT DOCUMENTS

| | | | |
|---|---|---|---|
| 3,340,003 | A | 9/1967 | Judd |
| 3,443,890 | A | 5/1969 | Sisson et al. |
| 3,669,620 | A | 6/1972 | Bennett et al. |
| 4,237,147 | A | 12/1980 | Merten et al. |
| 4,760,138 | A | 7/1988 | So et al. |
| 5,120,521 | A | 6/1992 | Ebinuma et al. |
| 5,332,564 | A | 7/1994 | Chapnerkar et al. |
| 5,558,850 | A | 9/1996 | Bleakley et al. |
| 5,846,500 | A | 12/1998 | Bunger et al. |
| 6,063,237 | A | 5/2000 | Adams et al. |

FOREIGN PATENT DOCUMENTS

| | | |
|---|---|---|
| BE | 1003269 A3 | 2/1992 |
| DE | 19 04 299 A1 | 9/1970 |
| EP | 0 286 564 A1 | 10/1988 |
| EP | 0 468 719 A1 | 1/1992 |
| GB | 1 222 471 | 2/1971 |
| JP | 48-55198 | 11/1971 |
| JP | 48-55198 A | 11/1971 |
| JP | 48-17438 | 5/1973 |
| JP | 53-054200 A | 5/1978 |
| JP | S53-54200 | 5/1978 |
| JP | 62202817 A | 2/1986 |
| JP | 4139020 A | 1/1990 |
| WO | WO 00/34182 | 6/2000 |
| WO | WO 2006/005793 A1 | 1/2006 |

OTHER PUBLICATIONS

Filipescu, Preparation of pure calcium carbonate, XP002026052, Chemical Abstracts, Chemical Pan 107-117846Z abstract.
GB0917248.7 Intellectual Property Office Search REport dated Mar. 1, 2010.
GB0921820.7 Intellectual Property Office Search Report dated Nov. 11, 2010.
Patt, R., et al, Paper and Pulp; 1. Pulp, in: Ullmann's Encyclopedia of Industrial Chemistry (Jun. 15, 2000), pp. 33-40 [Retrieved on May 4, 2011], DOI: 10.1002/14356007..a18_545.
PCT/EP2010/006036 International Preliminary Examination Report dated Apr. 3, 2012.
PCT/GB2010/002267 International Search Report dated May 5, 2011.
Van Balen, Carbonation reaction of lime, kinetics at ambient temperature, Cement and Concrete Research, Pergamon Press, Elmsford, NY, vol. 35, No. 4, Apr. 1, 2005, pp. 647-657.

*Primary Examiner* — Stuart Hendrickson
(74) *Attorney, Agent, or Firm* — Woodard, Emhardt, Moriarty, McNett & Henry LLP (57) ABSTRACT

A method of producing calcium carbonate from a waste sludge containing calcium carbonate and at least one silicate mineral. The method comprises the steps of:

(i) incinerating the sludge to an ash in which at least 60% of the calcium carbonate present in the sludge is converted to free calcium oxide which is unreacted with the silicate mineral(s),
 (ii) optionally slaking the ash to convert at least a portion of the free calcium oxide therein to calcium hydroxide,
 (iii) treating either the ash from step (i) or the slaked ash from step (ii) with an aqueous solution of a polyhydroxy compound to provide a solution of dissolved calcium hydroxide,
 (iv) separating insoluble material from the solution of calcium ions obtained in step (iii),
 (v) dispersing carbon dioxide through the solution obtained from step (iv) so as to produce calcium carbonate, and
 (vi) separating the calcium carbonate produced in step (v).

37 Claims, 1 Drawing Sheet

PRODUCTION AND/OR RECOVERY OF PRODUCTS FROM WASTE SLUDGE

CROSS-REFERENCE TO RELATED APPLICATION

This application is a continuation of International Application No. PCT/GB2010/002267 filed Dec. 14, 2010, which claims the foreign priority benefit of United Kingdom Application No. GB 0921820.7 filed Dec. 14, 2009, which is hereby incorporated by reference.

BACKGROUND

The present invention relates, in its most general sense, to the production and/or recovery of industrially useful products from waste sludges containing calcium carbonate and at least one silicate mineral (e.g. kaolin). More specifically, the invention relates to the production and/or recovery of industrially useful products from an ash produced by incineration of the sludge. One aspect of the invention relates to the production of calcium carbonate from the sludge via its conversion to the ash. A further aspect of the invention is the recovery of silicate minerals from such an ash which are relatively free of lime.

The invention is concerned particularly (but not exclusively) with a method for the production and/or recovery of useful materials from waste sludge produced by a paper mill, and more particularly by a paper mill using recycled paper as a raw material, the method involving production of an ash from the sludge as an "intermediate". Of prime concern is the production from such sludge of calcium carbonate for use in paper, polymers, coatings and sealants where high value calcium carbonate products are required while a secondary concern is the recovery and beneficiation of metakaolin for use in cement, concrete, polymers and coatings.

Calcium carbonate is the main mineral pigment used in paper manufacturing both as a filler and as a coating material. Calcium carbonate is also used extensively as a functional filler in materials such as paints, coatings, plastics, sealants and inks. Other applications of calcium carbonate are in the food, cosmetics and pharmaceutical industries For paper coating the manufacturer needs a pigment which gives good optical properties (high brightness, opacity and gloss) and good printability. The morphology of the pigment is important to give the appropriate rheological effects. The purity of the product and the absence therefrom of large particles are essential for a very low abrasivity. Typically the mean particle size should be in the range 0.3 to 1 micron, with a very narrow particle size distribution.

For paper filling calcium carbonate with a mean particle size of 1.5 to 3.0 microns is used.

The average mineral loading for uncoated paper is around 25% by weight while for the coated paper grades it is around 45%

In many polymer, coating and sealant applications, high brightness calcium carbonates with tightly controlled particle sizes are used as functional fillers to bring improvements in appearance, mechanical properties and processing compared with cheap extenders. Typically these products will have an ISO brightness over 90% and a mean particle size of less than 3 microns with a particle top cut of less than 10 microns. By virtue of their purity, fine particle size and lack of large hard particles, these products have relatively low abrasivity so reduce equipment wear in high shear processes such as polymer extrusion.

Calcium carbonate for use in at least some of the above applications may be in a form (so-called GCC) obtained by grinding of naturally occurring calcium carbonate. Alternatively the calcium carbonate can also be produced by a "chemical route" in which carbon dioxide is added to a solution of calcium ions, resulting in precipitation of calcium carbonate, referred to as PCC. Such "chemical routes" can be attractive in that the solution of calcium ions may be generated from a waste lime (CaO) or lime hydroxide ($Ca(OH)_2$) material, thus allowing production of industrially valuable calcium carbonate from a waste material which would otherwise give rise to problems and/or expense for disposal purposes.

A number of industrial processes produce sludges containing calcium carbonate and at least one silicate mineral as a waste product of the process. It has previously been proposed (see below) either to recover calcium carbonate from the sludge or to incinerate the sludge to convert a proportion of the calcium carbonate to calcium oxide which may then be converted to calcium carbonate by a "chemical route".

Examples of such sludges are those produced by paper mills (and which are referred to as "paper sludge").

All paper mills use large quantities of water. Typically the solid material content at the start of the process is less than 1%. Much of this water may be recycled but typically losses can be 20 $m^3$ per tonne of paper produced. This water will be charged with fibres and minerals such as calcium carbonate, kaolin and talc and other additives such as starch, latex, optical brightening agents and dyes. The waste water is pumped from the paper machine to a water treatment plant where solid materials are removed by flocculation and sedimentation. In many cases a secondary biological treatment will be used. The resulting sludge is usually then at least partially dewatered, e.g. on a filterpress or in a screw press (in both cases this is mechanical de-watering). This concentrates the sludge to a solid content of typically 60% to 70%. Paper mills using recovered waste paper have a supplementary process where the waste paper is broken down and the fibres are separated from the other materials essentially minerals. All except the fibres will go to the waster water treatment along with the charged water from the paper machine. If the paper mill makes white paper as opposed to grey board the process of separating the fibre and minerals is more sophisticated and uses a de-inking process. The de-inking process separates the cellulose fibres from all the other materials present in the recovered paper using floatation and decantation technology to separate minerals and fibres. However it is not possible to recover 100% of the fibres so a certain quantity of fibres is contained in the waste sludge. Typically for every 100 Tonnes of recovered paper that is recycled, 25 Tonnes of waste sludge will be produced which contains 50-60% organic material. The remaining inorganic material mainly comprises calcium carbonate and kaolin.

Typically the waste from a paper machine might be 3% of the paper produced whereas the waste from a mill using waste paper may be 25% of the paper produced. Thus paper mills using recovered paper as a raw material produce significantly greater quantities of paper sludge that those that do not.

The quantity of waste sludge produced by the European paper industry is several million Tonnes per year.

There are a number of disposal routes for paper sludge including, burning as an alternative fuel in cement kilns, on-site thermal utilisation, composting, land spreading and landfill.

In many countries, more stringent regulations for landfill of organic waste has led to an increase in the burning of paper sludge so now more than half of the sludge in Western Europe is disposed of in this way. This approach enables recovery of thermal energy, elimination of hazardous organic constituents and reduction in waste volume.

Incineration or combustion plants, which meet waste and emission regulations, are designed to extract energy while producing paper sludge ash (PSA). Combustion technologies can include fixed hearth, fluid bed and rotary kilns. The fluid bed combustor (FBC) is often the chosen technology having a high heat transfer efficiency, low capital cost and it can handle aqueous organic sludge.

The composition of PSA typically consists of a mixture of inorganic materials predominately formed from the calcium carbonate and kaolin present in the waste paper sludge. A range of other mineral pigments may also be present in the waste paper sludge including talc, titanium dioxide, calcined clay, bentonite, aluminium trihydrate and precipitated silica.

When the incineration process is controlled at temperatures in the region of 600-800° C. the ash contains a mixture of calcium carbonate, calcium oxide and metakaolin along with some minor amounts of other minerals. In addition some carbon may remain from the burning of the organic constituents When incineration occurs at temperatures above 800° C. or when the incineration temperature is uncontrolled (often the practice) then most of the calcium carbonate present will decompose to calcium oxide that may react with kaolin and other minor minerals present to form hard glassy calcium aluminium silicate minerals such as gehlenite.

Where the main objective is to recover energy, fluid bed combustors are designed to run at high temperatures (between 800° C. and 1000° C.) but with very short residence times of less than 3 minutes. Under these conditions there is incomplete decomposition of the calcium carbonate and hard glassy silicate minerals may be formed. The incomplete decomposition is probably due to an insufficient time for the adequate transfer of heat into the middle of large agglomerates. Some of the calcium oxide formed immediately reacts with the kaolin and this further depletes the amount of free calcium oxide left in the ash.

In addition some carbon may still remain from the burning of the organic constituents.

Subsequent uses of the ash (PSA) include cement production, lightweight concrete blocks, land spreading and cattle bedding. However PSA has little or no value in these applications. The remaining PSA has traditionally gone to landfill but increasingly this option is discouraged owing to the free lime (Calcium Oxide) content of PSA. PSA is unsuitable for use in blended structural concrete due to the free lime content which will react with atmospheric carbon dioxide so weakening the concrete matrix over a period of time.

There has thus been an incentive to produce and/or recover potentially useful materials from the paper sludge or ash produced by incineration thereof.

Separation of pure fillers from the carbon and/or hard silicate minerals in ash produced during any combustion conditions is extremely difficult. Likewise addition of virgin materials to mask the detrimental effects of un-reacted carbon or hard silicate minerals has not been successful.

In the prior art there are many patent specifications that describe processes for modifying the properties of sludge or PSA in such a way as to make the recycled fillers suitable for paper making but these have failed to achieve a route for recovering a calcium carbonate having both high brightness and low abrasion.

The direct enhancement of deinking sludge is described in EP 0737774 (ECC Int Ltd). In particular the method involves addition of calcium hydroxide to the aqueous sludge mixture followed by carbonation to precipitate calcium carbonate which entrains the ink particles, inorganic pigment particles and organic fibres. This process leads to a reduction in the sludge darkness and increases the amount of calcium carbonate so the sludge may be recycled. This invention suffers from 3 serious drawbacks 1. The majority of the final product is likely to consist of fresh calcium carbonate formed during the recycling process.
2. The enhanced sludge can only be used in very dilute form to supplement virgin fillers used in the manufacture of paper.
3. The ISO brightness of the final product is in the region of 60-70%, still much lower than that of virgin PCC or GCC.

The final product quality is also significantly influenced by variations in the composition of the deinking sludge.

A similar approach, described in U.S. Pat. No. 5,759,258 (Minerals Technologies, Inc.) and EP 0815175 (Minerals Technologies, Inc.), mentions the addition of calcium hydroxide to the paper sludge ash, produced by high temperature combustion. The objective of the combustion step is to remove the entire organic fraction and decompose the calcium carbonate to calcium oxide. In doing so new stable minerals are formed, including gehlenite ($Ca_2Al_2SiO_7$) and anorthite ($CaAl_2Si_2O_8$). Calcium hydroxide is added to an aqueous slurry of this ash and carbonated. Carbon dioxide reacts with both the calcium ions originating from the sludge and those introduced as calcium hydroxide to form an outer layer of calcium carbonate around the inner ash particle. Although the product from this invention has a relatively high brightness, this process has serious drawbacks. The majority of the product mass is derived from the added calcium hydroxide; the ISO brightness of 94-96% is insufficient in some paper applications so blending with virgin fillers is required and the product of this invention contains 5-15% of large, hard gehlenite particles which will lead to unacceptably high wire abrasion for use in paper manufacture.

A different approach is adopted in U.S. Pat. No. 5,846,378 (ECC INT Ltd), where carefully controlled combustion of the sludge is employed to optimise the balance of brightness and abrasion. The invention of U.S. Pat. No. 5,846,378 is concerned with removing the organic component while minimising the decomposition of calcium carbonate to calcium oxide. In accordance with the process of U.S. Pat. No. 5,846,378, not more than 50% (and desirably not more than about 25% by weight) of the calcium carbonate is converted to calcium oxide. In this way the formation of hard minerals such as gehlenite is also minimised. A narrow temperature window is specified whereby the fibres and ink burn off leaving a white inorganic fraction mainly consisting of calcium carbonate and metakaolin. Conditions are set to keep the temperature below 800° C. A two stage combustion process is proposed, in order to overcome localised exothermic heating as agglomerated fibres burn. The resultant ash is slaked and carbonated to convert any calcium oxide present to carbonate. This can be followed by intensive grinding to reduce the mineral particle size to that required for the paper making process. The product of this procedure, a mixture of calcium carbonate and metakaolin, has an ISO brightness in the range of 70-75% significantly inferior compared to virgin calcium carbonate and kaolin. It is unsuitable for most applications. The product of the procedure has a relatively high Einlenher wire abrasion, in the region of 30-70 mg. A modification of this process is cited in U.S. Pat. No. 6,063,237 (Imerys) where further calcium hydroxide is added to the ash prior to carbonation, making small improvements in brightness and abrasion. An example in the patent shows that half the product mass derives from this addition of fresh calcium hydroxide.

U.S. Pat. No. 6,830,615 (Imerys) also discloses the controlled temperature combustion approach to manufacture high surface area fillers. In this case the combustion is at higher temperatures (around 800-900° C.) with the purpose of decomposing the maximum amount of calcium carbonate, reacting this with the metakaolin to form hard glassy silicate particles. These are intensively ground to reduce the particle size and abrasivity while unlocking free lime. A carbonation step follows the grinding to prepare a composite filler with high surface area which gives superior opacity in paper. However the wire abrasion is still relatively high and the ISO brightness is in the region of 75-80%, significantly lower than virgin calcium carbonate or calcined kaolin.

In the inventions described above, the paper mill sludge or paper sludge ash is enhanced but there is no separation of the individual minerals, for example the calcium carbonate and kaolin. This means that the end products are dependent on the composition and consistency of the original deinking sludge.

Attempts to separate the minerals present in the sludge have been focussed on the extraction of calcium carbonate using mineral acids. For example, U.S. Pat. No. 7,300,539 (Imerys) describes a route where the deinking sludge is treated with dilute acid which reacts with the calcium carbonate to form calcium salts soluble in water. The calcium salt containing solution is removed from the insoluble fraction and calcium carbonate precipitated by the addition of sodium chloride or sodium hydroxide. The insoluble fraction containing the fibres and predominately kaolin is dried and incinerated at high temperatures to remove organic components and to produce calcined kaolin. The calcium carbonate obtained this way has a slightly superior ISO brightness (83.4%) compared to that obtained by the controlled combustion process above but this is still significantly lower than virgin calcium carbonate.

U.S. Pat. No. 5,919,424 (Thermo Fibergen) cites a similar process with controlled additions of a wide range of acids to either the sludge or the ash. The resulting soluble salts can be extracted and dried but suffer from the drawback of contamination by other metals such as aluminium, magnesium and iron also extracted by the acid.

In summary the attempts to hide the adverse properties of gehlenite and other hard minerals by milling the PSA and forming PCC by precipitation in-situ failed because the abrasion is too high while the milling of the low temperature PSA to produce a fine blended composite filler of calcium carbonate and metakaolin (without the formation of gehlenite and other hard minerals) failed because too much un-burnt carbon was remaining. Therefore the brightness was unsatisfactory.

The other processes described in the prior art utilising dilute acids in order to extract calcium ions from either the sludge or PSA followed by precipitation of calcium carbonate can separate calcium carbonate but only with other metal contaminants. The process economics for this route may only be commercially interesting where the ratio of calcium carbonate to kaolin to low.

There are many patents that include the use of paper mill sludge or PSA in cement and concrete manufacture but only as a waste feed to the cement kiln, along with other waste sludge and ash to help dilute the level of Portland cement.

Other prior art concerns the use of paper mill sludge along with coal ash in compositions suitable for the fabrication of un-fused blocks and aggregates for use in concrete products.

U.S. Pat. No. 5,868,829 (CDEM) relates to a combustion process specifically for the manufacture of a PSA containing a low amount of calcium oxide. Calcium oxide is known to have a detrimental effect on the long term strength of concrete as it will react with carbon dioxide to form calcium carbonate with an increased volume. The reduction of calcium oxide enables the pozzolanic properties of the metakaolin component to be utilised in concrete without the long term weakening of the concrete. This reduction is achieved by controlling the combustion temperature and introducing water into a second combustion chamber to convert the calcium oxide to hydroxide.

US 2005/0223950 (CDEM) discloses a method of treating a material comprising a pozzolanic component to produce a product with enhanced pozzolanic activity. The material to be treated may, for example, be a paper ash containing approximately 30% metakaolin as the pozzolanic component. The ash itself is preferably prepared by thermal treatment of a paper sludge in accordance with the procedure described in PCT/NL95/00280 (equivalent to U.S. Pat. No. 5,868,829—see above). The method of US 2005/0223950 for treating the pozzolanic material (e.g. paper ash) comprises treating the material with an aqueous liquid having a pH of less than 12.5 so as to extract calcium from the material and produce a calcium-enriched aqueous solution and a calcium-depleted solid residue, the latter being the product with enhanced pozzolanic effect. The aqueous liquid used in the treatment process may for example be water but is more preferably an aqueous acidic solution (e.g. hydrochloric acid or acetic acid), optionally containing a chelating compound such as EDTA. The calcium enriched solution is separated from the solid residue which may be used with or without drying to prepare cement or concrete. It is disclosed that the calcium-enriched aqueous solution may be treated with carbon dioxide to produce calcium carbonate but no details of the product quality are given. In the specific Examples of US 2005/0223950 two materials are treated in accordance with the procedure of the patent specification to provide a product of enhanced pozzolanic activity. One material is designated CDEM-ash 1 which is stated to be obtained by thermal treatment of paper ash as described in PCT/NL95/00280 (equivalent to U.S. Pat. No. 5,868,829—see above). The other material, designated as CDEM-ash 2 is obtained by heating CDEM-ash 1 in air in an electric furness at 1050° C. for 12 hours. The mineral composition of CDEM-ash 1 as determined by X-ray diffraction shows it to have a $CaCO_3:CaO$ ratio of 71:29 which represents about 41% conversion of the calcium carbonate in the original paper sludge. The incineration conditions used for producing CDEM-ash 2 would result in a considerable amount of calcium oxide reacting to form silicates and aluminates.

SUMMARY OF THE INVENTION

According to a first aspect of the present invention there is provided a method of producing calcium carbonate from a waste sludge containing calcium carbonate and at least one silicate mineral, the method comprising the steps of:

(i) incinerating the sludge to an ash in which at least 60% of the calcium carbonate present in the sludge is converted to calcium oxide which is unreacted with the silicate mineral(s), (ii) optionally slaking the ash to convert at least a portion of the free calcium oxide therein to calcium hydroxide, (iii) treating either the ash from step (i) or the slaked ash from step (ii) with an aqueous solution of a polyhydroxy compound to provide a solution of dissolved calcium hydroxide, (iv) separating insoluble material from the solution of calcium ions obtained in step (iii), (v) dispersing carbon dioxide through the solution obtained from step (iv) so as to produce calcium carbonate, and (vi) separating the calcium carbonate produced in step (v).

The method of the invention provides a route for the conversion of a waste sludge containing calcium carbonate and silicate mineral(s) to a pure form of calcium carbonate which (as detailed below) has use in a variety of applications. In the method of the invention, the waste sludge is incinerated so as to convert at least 60% (and more preferably at least 80%, even more preferably at least 90%) by weight of the calcium carbonate present in the sludge to calcium oxide but under conditions in which reaction of calcium oxide with silicate minerals is limited. Thus a high proportion (i.e. greater than 60% by weight) of the calcium carbonate present in the sludge is converted to "free" calcium oxide (some of which may be in the form of $Ca(OH)_2$) which is available for dissolution in an aqueous solution of a polyhydroxy compound in step (iii) of the method to produce a solution which is then carbonated in step (iv) to produce a pure form of calcium carbonate. It will be appreciated that the method of the invention seeks to maximise the amount of calcium oxide present in the ash which is available for dissolution with the polyhydroxy compound and minimise the amount of calcium oxide which is not available for dissolution by virtue of reaction with silicate minerals.

In advantageous embodiments of the invention, at least 80%, and more preferably at least 90%, by weight of the calcium carbonate present in the original sludge is converted during the incineration step to calcium oxide which is available for dissolution in the solution of the polyhydroxy compound.

Calcium carbonate produced in accordance with the invention has a number of advantages. For example, it has good values for both brightness, light scattering and gloss as well as low abrasivity which makes it particularly suitable for use in the paper coating, paint and polymer industries particularly for embodiments of the invention in which the calcium carbonate produced has a very regular "rice grain" crystal morphology which leads to superior rheological effects. Additionally the purity of the product and the absence of large particles provide for very low abrasivity. Calcium carbonate produced in accordance with the invention also has a wide variety of applications beyond the paper coating, paint and polymer industries.

Calcium carbonate produced by the method of the invention is suitable for use as a coating or filler pigment for paper as it exceeds the specification of calcium carbonate pigments normally used in these applications.

The calcium carbonate produced is also very suitable for coatings, sealants, polymers and other high value applications.

The method of the invention is particularly (although not exclusively) applicable to the treatment of a paper mill's waste sludge (which will contain variable amounts of calcium carbonate, kaolin and organic materials mixed with various minor ingredients such as talc, silica and titanium dioxide) in accordance with the method of the first aspect of the invention. The ash which remains after incineration of the paper sludge in step (i) of the method contains variable amounts of calcium carbonate, calcium oxide, and metakaolin mixed with various abrasive minerals such as gehlenite, larnite and akermanite. This ash can then be used to produce a pure high brightness calcium carbonate by following steps (ii) to (vi) of the method.

A further feature of the method of the first aspect of the invention which is applicable generally to the treatment of waste sludges containing calcium carbonate and kaolin as a silicate mineral (and which is particularly applicable to the treatment of paper sludges) is that the insoluble material separated in step (iv) of the method comprises metakaolin (possibly with other silicate minerals) which is substantially devoid of calcium oxide (which, it will be appreciated, has been dissolved out of the ash during step (iii) of the method). Such a metakaolin substantially devoid of free lime can be used in pozzolanic cement applications where PSA is unsuitable and in higher value applications such as coatings and polymers.

The production of metakaolin substantially devoid of free lime is an important aspect of the invention in its own right and therefore in accordance with a second aspect of the present invention there is provided a method of producing metakaolin from a waste sludge containing calcium carbonate and kaolin and optionally other silicate minerals, the method comprising the steps of:

(i) incinerating the sludge to an ash in which at least 60% of the calcium carbonate present in the sludge is converted to free calcium oxide which is unreacted with the silicate minerals, (ii) optionally slaking the ash to convert at least a portion of the free calcium oxide therein to calcium hydroxide, (iii) treating either the ash from step (i) or the slaked ash from step (ii) with an aqueous solution of a polyhydroxy compound to provide a solution of dissolved calcium hydroxide, and (iv) separating insoluble material including metakaolin substantially devoid of free calcium oxide from the solution obtained in step (iii).

Thus treatment of a waste sludge (e.g. paper sludge) containing calcium carbonate and kaolin can yield two product streams, i.e. a high brightness pure calcium carbonate and a metakaolin largely free of calcium. The recovered metakaolin can be used in pozzolanic cement applications where PSA is unsuitable and in higher value applications such as coatings and polymers.

A further feature of the method of the invention is that thermal energy produced by incineration of the waste sludge can be used to produce electricity and converted to steam for other uses.

DESCRIPTION OF PREFERRED EMBODIMENTS

The invention is applicable to the treatment of waste sludges comprising calcium carbonate and silicate mineral(s). The invention is particularly applicable to the treatment of at least partially dewatered sludges. The invention has particular (but not exclusive) application to the treatment of paper sludges but may also be applied to sludges from other water treatment installations such as municipal water treatment plants. As indicated above, the method of the invention is ideally operated to produce two product streams (i.e. high brightness, pure calcium carbonate and metakaolin largely free of free lime) but can be operated to produce one but not the other of calcium carbonate and metakaolin.

The first step in the method of either the first or second aspect of the invention is to effect incineration of the sludge to produce an ash under conditions such that at least 60% by weight of the calcium carbonate present in the sludge fed to the incineration process is converted to "free" lime (calcium oxide, i.e. CaO). By the term "free lime" we mean lime which is in a chemical form which is capable of being dissolved in the solution of the polyhydroxy compound employed in step (iii) of the method. Although the "free lime" is in a chemical form available for dissolution, it may nevertheless be "physically entrapped" within particles of the ash. Therefore to make the "free lime" available for dissolution preferred embodiments of the invention will involve grinding to reduce its particle size and expose free lime for dissolution. Preferably grinding is effected so that at least 50% by weight of the ash particles have a mean particle size of less than 20 μm.

Conversion of at least 60% by weight of the calcium carbonate present in the original sludge to free lime has the advantage that a major amount of that calcium carbonate is converted into a form available for dissolution in step (iii) of the process to produce a solution which may be carbonated to "regenerate" calcium carbonate. The incineration of the sludge to convert at least 60% by weight of the calcium carbonate is an important feature of the invention and in contrast to many conventional waste sludge incineration techniques in which significantly less than 50% by weight of the calcium carbonate present in the sludge is converted to lime. Sludge ashes containing free lime in an amount representing conversion of at least 60% by weight of the calcium carbonate present in the original sludge have significant advantages compared to the use of sludge ashes in which the amount of lime represents less than 50% by weight conversion of the calcium carbonate in the original sludge. Two advantages may be mentioned in particular. The first is a higher yield of "regenerated" calcium carbonate from the original sludge. The second is the use of lower amounts of the solution of the polyhydroxy compound in step (iii) of the process.

For all of the above reasons, it is preferred that at least 80%, and more preferably at least 90%, by weight of the calcium carbonate present in the original sludge is converted to free lime.

The conversion of the required level of calcium carbonate in the original sludge to free lime in the ash may be controlled by the time and temperature conditions adopted in the incineration process. Generally the incineration temperature will be in the range of 700 to 1000° C., more preferably 800-900° C. During the initial stages of incineration, an increasing amount of the original calcium carbonate will be converted to free lime but with increasing temperature the amount of the latter will decrease due to its reaction with silicate minerals. Consequently incineration of the sludge for the purposes of the present invention is conducted under time and temperature conditions in which more than 60% (preferably at least 80% and more preferably at least 90%) by weight of the original calcium carbonate is converted, and maintained as, free lime in the ash.

As indicated above, ash obtained from the incineration process may be ground to reduce particle size before being passed to subsequent steps of the method.

As a subsequent step, the ash may be slaked with water to convert at least some of the free lime to calcium hydroxide ($Ca(OH)_2$) but this is not essential and it will generally be possible to admix the ash (ground or otherwise) with the solution of the polyhydroxy compound for the purposes of step (iii) of the method (either the first or second aspect) since the amount of heat generated by way of exothermic hydration of the free lime will not be unduly high.

Step (iii) of the method of either aspect of the invention involves the production of a solution of calcium ions (derived from the free lime in the ash) in a polyhydroxy compound which promotes the dissolution of the calcium. Given that the method is to be operated to produce calcium carbonate, additional "fresh" lime (e.g. burnt lime obtained from another industrial process involving calcination of calcium carbonate) may if desired also be incorporated in the solution of the polyhydroxy compound, preferably after the addition of the ash thereto. This fresh lime may either be added to the solution of the polyhydroxy compound immediately after the ash, or be slaked in water and the resulting calcium hydroxide is then added to the solution of the polyhydroxy compound. (The final solution produced preferably comprises 10% to 35% by weight of the dissolved polyhydroxy compound and 1% to 5% by weight of dissolved lime hydroxide (expressed as $Ca(OH)_2$). The solution generally has a pH of at least 11.5, but usually at least 12.

As a general rule, the greater the amount of the dissolved polyhydroxy compound the greater is the amount of calcium ions that may be dissolved therein. Thus, for example, if the solution contains about 12% of the polyhydroxy compound then the amount of calcium hydroxide (expressed as $Ca(OH)_2$) that may be dissolved therein will be a maximum of about 2%. As a further example, a solution containing about 25% by weight of the polyhydroxy compound can contain a maximum of about 4% of dissolved calcium hydroxide.

Whilst the method of the invention is effective using amounts of 10% to 35% by weight of dissolved polyhydroxy compound and 1% to 5% by weight of dissolved calcium hydroxide, we particularly prefer that the amount of polyhydroxy compound is in the range 20% to 30% and the amount of dissolved calcium hydroxide is 2 to 4.5%. More particularly, we prefer that the amount of the polyhydroxy compound is in the range 23% to 27% and the amount of dissolved calcium hydroxide is in the range 3 to 4.0%. Particularly good results are obtained using about 25% by weight of dissolved polyhydroxy compound and about 3.4% to 3.9% by weight of the dissolved calcium hydroxide.

Examples of polyhydroxy compounds which may be employed for the method of the invention are as disclosed in WO-A-0034182 (Kemgas Ltd) and include compounds of the formula:

$$HOCH_2(CHOH)_nCH_2OH$$

where n is 1 to 6. Thus for example the polyhydroxy compound may be glycerol (n=1). It is however more preferred that n is 2 to 6 and is particularly preferred that the polyhydroxy compound is a sugar alcohol (a "hydrogenated monsaccharide"). Examples of sugar alcohols include sorbitol, mannitol, xylitol, threitol and erythritol.

Also useful as polyhydroxy compounds that may be employed in the invention are those having a straight chain of n carbon atoms where n is 4 to 8 and (n−1) of the carbon atoms have a hydroxy group bonxed thereto. The other carbon atom (i.e. the one without the hydroxyl group) may have a saccharide residue bonded thereto. Such compounds are hydrogenated disaccharide alcohols and examples include maltitol and lactitol.

Particularly preferred for use in the invention are the hydrogenated monosaccharide (e.g. sorbitol) and disaccharide alcohols because of their thermal stability which can be important for subsequent processing of the calcium ion solution (see below).

Mixtures of the above described polyhydric alcohols may be used. Thus it is possible to use industrial sorbitol which, of the solids present, comprise about 80% sorbitol together with other polyhydroxy compounds such as mannitol and disaccharide alcohols. Examples of industrial sorbitol include Sorbidex N.C. 16205 from Cerestar and Meritol 160 from Syral.

Additionally however the polyhydroxy compound may be a saccharide (e.g. a mono- or di-saccharide).

The solution prepared in step (iii) of the process is then treated in step (iv) to remove insoluble material, including suspended solids, which will contain metakaolin and metal impurities, this being one step which results in the purity of the calcium carbonate product obtained by the method of the invention. It is particularly preferred that suspended solids are removed by a flocculation step. The flocculating agent used may, for example, be a cationic polymer (such as Nalco 9908) which is added to the solution with mixing. Flocs and solids may be separated from the solution by conventional techniques. Thus, for example, the solution may be passed to a "settler" which allows the flocs to be collected at, and discarded from, the bottom thereof. The solution may then be filtered through a sand column, or any other appropriate device, to remove remaining solid material.

The insoluble material separated in step (iv) of the method will be essentially devoid of free lime. Thus in the case where the original sludge included kaolin as a silicate material, the insoluble solids separated in step (iv) of the process will comprise essentially lime free metakaolin which has value for use in pozzolanic cement applications, as outlined above. The insoluble waste can be washed, filtered and dried if necessary, to yield a product suitable for cement and concrete applications, especially where the absence of any free lime (calcium oxide or calcium hydroxide) is advantageous. Removing calcium oxide from the metakaolin containing PSA improves the compressive strength of concrete containing it and allows use in higher value blended cements.

The solution obtained from step (iv) is then subjected to a carbonation reaction (step v) in which carbon dioxide either pure or diluted (if for instance a flue gas is used) is bubbled through the solution.

It is preferred that the reaction is effected in a batch reactor with a high shear gas dispersion agitator. However it is also possible to perform the reaction continuously either in a series of reactors with high shear agitators or in-line, adding the gas via ejectors in one or more steps. The amount of carbon dioxide added should be at least the stoichiometric amount required for conversion of all calcium ions in the solution to calcium carbonate.

The solution to be carbonated will typically be at a controlled temperature at the start of the carbonation reaction. Starting temperature will preferably be in a range of 10 to 40° C., and ideally in a range of 25 to 32° C.

During the course of a typical reaction, the pH (which is initially at least 11.5, more usually at least 12) progressively decreases. In order to obtain calcium carbonate of high purity we prefer that the dispersion of carbon dioxide into the reaction mixture (i.e. during step (v) of the process) is terminated before the pH falls below 9 and also that an alkaline agent is added to maintain the pH of the product mixture at a value of at least 9. Under these pH conditions impurities remain dissolved and the precipitated calcium carbonate is pure. More preferably the dispersion of carbon dioxide is terminated before the pH falls below 9.5 and the alkaline agent is added to maintain a pH value for the product mixture of at least 9.5.

In preferred embodiments of the invention, there will, at a certain moment in the carbonation reaction, be a marked increase in the viscosity of the solution. We call this phase 2. Depending on the particular concentrations of polyhydroxy compound and calcium hydroxide in the starting solution this increase in viscosity may be caused by gel formation. Our studies have established that the progressive decrease in pH of the reaction mixture abruptly changes usually at a value of about 9.5 to 11.5 (e.g. about 10.2-10.8) to a sudden rise of typically 0.5 to 1 pH unit before continuing to decrease again.

The start of the short, sharp rise in pH denotes the end of phase 2 and during the period of the rise the calcium carbonate particles precipitate rapidly. As stated above, the amount of carbon dioxide to be added during the reaction should be at least the stoichiometric amount required for conversion of all calcium ions in the solution to carbon carbonate. Under the conditions described herein to make a 0.8 micron particle the quantity of carbon dioxide injected during phase 1 is between 70 and 85% of the total, with the remainder being injected in phase 2. Flow rates are generally as high as process conditions will allow. Those in phase 1 are generally much higher than in phase 2. Typically a reaction takes between 15 and 30 minutes.

An important feature of preferred embodiments of the invention for obtaining high purity calcium carbonate is that once the pH of the product mixture begins to decrease after its short sharp rise it is not allowed to fall below 9.0, more preferably not less than 9.5, even more preferably not less than 10 and is ideally maintained at a value of at least 10.5.

We have established that this tight control of the pH of the product mixture (rather than simply allowing the pH to fall to lower values) is important in ensuring production of calcium carbonate of small uniform particle size and purity of the final calcium carbonate product. More particularly, we have found that some of the metal impurities present in the lime go into solution in step (iii) of the method (e.g. by chelation with the polyhydroxy compound) and are therefore not removed in solids separation step (iv). By ensuring that the pH of the product mixture does not fall below 9.0 (preferably not below 9.5), most of these metal impurities remain in solution and therefore do not contaminate the final precipitated calcium carbonate.

The arrest of the pH fall may be achieved by addition, to the product mixture, of an alkaline reagent. Most preferably the alkaline reagent is added to the product mixture as soon as practicably possible once the pH begins to fall after its short rise and in any event in time to ensure that the pH does not fall below 9.0 (preferably not below 9.5). The alkaline agent should be one which does not lead to the introduction of impurities into the precipitated calcium carbonate product. For this reason, it is highly preferred to use as the alkaline agent a solution such as obtained from step (iv) as outlined above since the dissolved metal impurities contained therein do not precipitate to any substantial extent under the pH conditions prevailing in the product mixture. Typically the amount of this solution used will be 3 to 8% by volume of the product mixture so as to achieve the required arrest of the pH fall.

The solid calcium carbonate may be separated from the product mixture (step (v) of the method) by any conventional separation technique. Thus, for example, a filter press may be used.

The liquor separated from the product mixture contains polyhydroxy compound which, ideally, is recycled for the purposes of producing a solution as required by step (iii) of the method. This assists with the overall economics of the process. For this purpose, the separated liquor is purified and concentrated before being returned to step (iii). Purification serves to remove impurities which might otherwise pollute calcium carbonate produced from the recycled solution of polyhydroxy compound. Purification is most conveniently effected by reducing the pH of the liquor to a value of 7 to 8 by addition of carbon dioxide. Subsequently the solution is subjected to evaporation to increase its concentration to a value appropriate for use in step (iii) of the method. Evaporation should be effected under conditions that do not cause any significant decomposition of the polyhydroxy compound. Vacuum evaporation is preferred. After the evaporation step, the remaining solid contaminants are removed from the solution, for example by a second flocculation and a filtration or sedimentation step, as described above for step (ii), but not necessarily with both.

Further details of the above described process involving pH control of the carbonation reaction are disclosed in co-pending PCT Patent Application No. PCT/EP2010/006036, the disclosure of which is hereby incorporated by reference. This prior application discloses production of calcium carbonate having a "rice grain morphology", i.e. the individual particles of calcium carbonate have the appearance of grains of rice.

Additional Description

The following additional description is provided by way of explanation of preferred embodiments of the invention and is not in any way to be construed as limiting.

This method, for treating a paper mill's sludge to recover and recycle valuable minerals, includes a number of discrete steps, including combustion, dissolution, carbonation, filtration, washing and drying.

The combustion step is required to incinerate the organic material and to decompose the calcium carbonate to calcium oxide. Where the process conditions are insufficient for full decomposition of the calcium carbonate, as is usually the case for commercial combustion plants designed for efficient thermal recovery, the incinerated product consists of metakaolin, calcium carbonate, calcium oxide and silicate minerals for example gehlenite, larnite or akermanite. The paper sludge ash produced in commercial combustion plants can have particles and agglomerates ranging in size from 1 to 200 microns. Therefore it maybe preferable to grind the PSA to reduce the particle and agglomerate size to less than 20 microns. This exposes more freely available calcium oxide particles ready for the next step.

During the dissolution step, paper sludge ash (PSA) is added, with or without pre-slaking, to an aqueous promoter solution comprising of 10% to 35% by weight of dissolved polyhydroxy compound to dissolve the calcium hydroxide present as described in WO-A-0034182 (Kemgas Ltd) and aforementioned co-pending PCT Patent Application No. PCT/EP2010/006036.

Surprisingly we have found that it is preferable to carry out the slaking and dissolution simultaneously by adding the PSA directly to the promoter solution so ensuring that the maximum amount of calcium hydroxide is dissolved. Unlike the addition of 100% lime, the exothermic heat generated is insufficient to damage the polyhydroxy compound.

We also found that the concentration of calcium ions in solution is primarily determined by the amount of calcium oxide available in the PSA and therefore the amount of PSA added to the solution can be adjusted to give the optimum amount of calcium ions available for the carbonation reaction as described in WO-A-0034182 (Kemgas Ltd) and aforementioned co-pending PCT Patent Application No. PCT/EP2010/006036.

Dissolution is possible using low shear mixing and is completed within 30 minutes. The slurry is then filtered to remove all the insoluble material leaving a solution containing the dissolved calcium ions. It is preferred that any suspended solids are removed by a flocculation step. The flocculating agent used may, for example, be a cationic polymer (such as Nalco 9908) which is added to the solution with mixing. Flocs and solids may be separated from the solution by conventional filtration techniques.

The insoluble waste or secondary product stream may consist of calcium carbonate, metakaolin and other silicate minerals for example gehlenite, larnite or akermanite. Where all the calcium carbonate has decomposed during combustion, the waste will consist of metakaolin and other silicate minerals. The insoluble waste can be washed, filtered and dried if necessary, to yield a product suitable for cement and concrete applications, especially where the absence of any free lime (calcium oxide or calcium hydroxide) is advantageous. Removing calcium oxide from the metakaolin containing PSA improves the compressive strength of concrete containing it and allows use in higher value blended cements.

In the carbonation step, the remaining clear filtrate, containing the calcium ions dissolved in the aqueous solution of the polyhydroxy compound, is subjected to a carbonation reaction where carbon dioxide is bubbled through the solution under controlled conditions to form pure calcium carbonate, as described in WO-A-0034182 (Kemgas Ltd) and aforementioned co-pending Patent Application No. PCT/EP2010/006036.

The calcium carbonate particles are removed from the solution by conventional filtration and washing, followed by a drying and de-agglomeration step if necessary.

Calcium carbonate produced in accordance with the invention has a number of advantages. For example, it has good values for both brightness, light scattering and gloss as well as low abrasivity which makes it particularly suitable for use in the paper coating, paint and polymer industries particularly in view of the very regular "rice grain" crystal morphology which leads to superior rheological effects. Additionally the purity of the product and the absence of large particles provide for very low abrasivity. Calcium carbonate produced in accordance with the invention also has a wide variety of applications beyond the paper coating, paint and polymer industries.

We are particularly surprised by the high purity and properties of the calcium carbonate recovered by this process for example a high brightness and extremely low wire abrasion for the product compared with values quoted in the previously reviewed prior art and with existing virgin calcium carbonate products.

We have established that the properties of the calcium carbonate, produced in accordance with this invention, are determined by the process conditions of the dissolution and carbonation steps rather than variation in composition of the original paper sludge and the technology and conditions used for the combustion of the sludge (as illustrated in Example 4). This is particularly advantageous as it means that the properties and quality of the calcium carbonate product are largely independent of the ash source or composition, in particular the relative amounts of calcium oxide, calcium carbonate and kaolin.

We have also established that the properties of the secondary metakaolin product stream are determined by the sludge combustion conditions which affect the ratio of metakaolin to complex silicate minerals and the ratio of calcium carbonate to calcium oxide.

The composition of the ash, specifically the amount of free calcium oxide available for slaking and dissolution, determines the overall process efficiency and calcium carbonate yield.

The commercially available PSA treated in Examples 3 and 4 generally contains a relatively low level of freely available calcium oxide which necessitates a high addition of this PSA to the polyhydroxy solution in order to obtain enough soluble calcium hydroxide in solution ready for the carbonation step. Unfortunately this leads to an increase in polyhydroxy compound loss in the higher amount of insoluble by-product stream. A low concentration of freely available calcium oxide will also adversely affect process economics by limiting the volume of calcium carbonate that can be recovered from each paper mill or associated combustion plant. Therefore we have found that it is necessary to control the combustion conditions in order to maximise the amount of free calcium oxide available for dissolution.

Soak calcining sludge for 2 hours at 800° C. results in the complete conversion of calcium carbonate to calcium oxide. The resulting PSA largely comprises of calcium oxide and metakaolin with minor amounts of other minerals for example talc. As the temperature is below that needed for the reaction of these components to form complex calcium aluminium silicate minerals, calcium di-silicate, calcium tri-silicate and calcium tri-aluminatealmost all of the calcium ions are available for extraction through dissolution in the polyhydroxy solution. This approach results in a much higher calcium carbonate yield compared with taking PSA from the standard fluid bed combustion process (as illustrated in Example 2).

In addition, we are surprised by the almost complete removal of free calcium oxide and calcium hydroxide from the secondary waste stream. This enhances its properties and performance in a number of applications, particularly in cement and concrete where the concentration and pozzolanic activity of the metakaolin component are significantly improved.

Although calcining for 2 hours improves the calcium carbonate recovery and enhances the properties of the secondary waste stream, these conditions are not commercially viable for high volume combustion and heat recovery. In existing commercial combustion plants the residence time can be less than 5 minutes and temperatures 800° C. to 1000° C.

Combustion conditions described in the prior art cover a wide temperature range and burning times. However the processing window to achieve optimum calcium oxide while minimising the formation of hard glassy silicate minerals is relatively low, for example in U.S. Pat. No. 5,846,378 this is an overall range of 600-800° C. and most preferably 680-720° C.

We have found that, for the method described in this invention, the combustion time and temperature window can be significantly larger ranging from 700° to 1000° C. (ideally about 800° C.) and from 3 minutes to 2 hours. We have demonstrated the effect of combustion conditions on the potential calcium carbonate yield by determining the concentration of soluble calcium hydroxide in the polyhydroxy solution after dissolving ash samples in the polyhydroxy compound solution, as demonstrated in Example 1.

Figure 1:
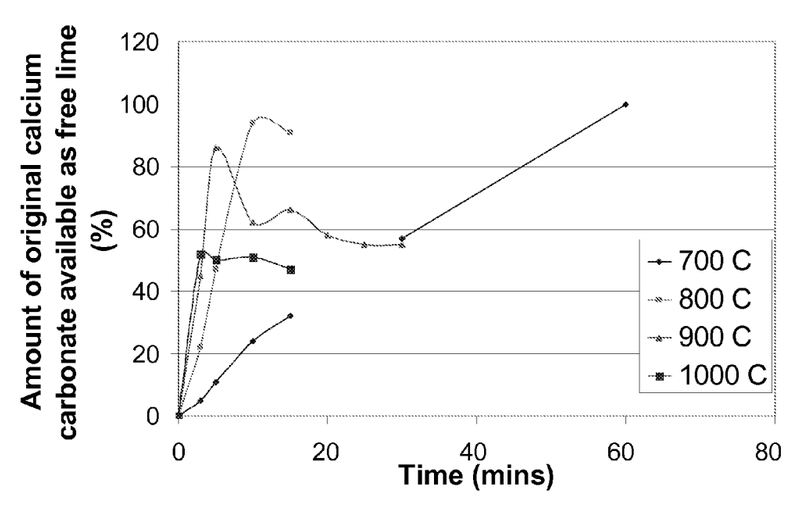
FIG. 1 is a graph showing the effect of incineration conditions (temperature and time) on the amount of freely available calcium oxide present in an ash obtained from paper sludge.

The correlation of soluble calcium hydroxide with the sludge combustion time over 3 temperatures is shown in the attached FIG. 1.

The relationship of combustion temperature and time with freely available calcium oxide is surprising because it demonstrates that even at temperatures of 800° C. and above, where calcium oxide is expected to react with the kaolin, there is a large amount of freely available calcium oxide present when the combustion time is controlled. In particular we found that a time range of 4 to 6 minutes at 900° C. or 10 to 15 minutes at 800° C. will enable almost the complete extraction of calcium ions in the promoter solution demonstrating that even though the calcium carbonate has decomposed to calcium oxide only a small amount of the oxide has subsequently reacted with the kaolin fraction.

Preferably the combustion time and temperature combination chosen should allow complete decomposition of calcium carbonate in the sludge while minimising the formation of calcium silicate and calcium aluminate minerals. Unlike in the prior art, the creation of hard silicate minerals described here simply reduces the amount of freely available calcium ions and does not adversely affect the quality of the recovered calcium carbonate product.

Another way to improve the process efficiency when using PSA is to add it together with virgin lime (CaO) or slaked lime $(Ca(OH)_2)$ directly to the promoter solution as described in Examples 4 and 5. This improves the calcium carbonate yield, reduces the relative amount of the waste stream and removes any constraint on plant capacity caused by insufficient availability of waste paper sludge or ash.

Addition of virgin lime to the PSA feed has no adverse effect on the calcium carbonate quality so can be added in the range 1% to 99%.

The invention will be illustrated by the following non-limiting Examples and with reference to the accompanying drawing, in which.

EXAMPLE 1

This Example demonstrates how temperature and time affect the composition of an ash obtained from a paper sludge, in terms of the amount of freely available calcium oxide present in the sludge.

Paper sludge from a German papermill using de-inked fibre was combusted for varying times at temperatures of 700° C., 800° C., 900° C. and 1000° C. by placing 50 g samples in a laboratory electric furnace. To reduce the material bed depth and improve heat flow, the small sample was spread evenly on a large tray.

The influence of these combustion conditions on the amount of freely available calcium oxide in the PSA was determined by adding 8.799 g of ash to 250 g of aqueous solution containing 25% of sorbitol. The mixture was then stirred in a 1 liter laboratory beaker for 30 minutes and the insoluble material removed by filtration using a Buchner funnel. The remaining clear filtrate was titrated with 0.1 molar hydrochloric acid to determine the concentration of calcium hydroxide in solution. The result was used to calculate the weight of calcium oxide extracted from the 8.799 g of ash and by extrapolation, the amount of calcium carbonate in the original sludge that decomposed to freely available oxide. The maximum concentration of soluble calcium hydroxide of 1.8% was obtained for paper sludge combusted for 1 hour at 700° C. XRD analysis of ash from sludge burnt at 800° C. for 1 hour confirmed an absence of calcium carbonate and calcium aluminium silicates. We assume that all the original calcium carbonate had decomposed to available calcium oxide and set this sample as the 100% control in the following table.

The results of this Example are shown in Table 1 below and also plotted in FIG. 1 of the accompanying drawings.

TABLE 1

| Sample | Combustion Temperature (° C.) | Combustion Time (mins) | Soluble Ca(OH)2 (%) | Soluble Ca(OH)2 (g) | CaO in the ash (%) | Proportion of CaCO3 decomposed to freely available CaO (%) |
|---|---|---|---|---|---|---|
| 6 | 700 | 5 | 0.2 | 0.500 | 4 | 11 |
| 7 | 700 | 10 | 0.43 | 1.075 | 9 | 24 |
| 8 | 700 | 15 | 0.58 | 1.450 | 12 | 32 |
| 13 | 700 | 30 | 1.04 | 2.600 | 22 | 57 |
| 9 | 700 | 60 | 1.81 | 4.525 | 39 | 100 |
| 5 | 800 | 3 | 0.4 | 1.000 | 9 | 22 |
| 4 | 800 | 5 | 0.86 | 2.150 | 18 | 47 |
| 3 | 800 | 10 | 1.71 | 4.275 | 37 | 94 |
| 1 | 800 | 15 | 1.65 | 4.125 | 35 | 91 |
| 2 | 800 | 30 | 1.65 | 4.125 | 35 | 91 |
| 19 | 900 | 3 | 0.82 | 2.050 | 18 | 45 |
| 10 | 900 | 5 | 1.56 | 3.900 | 34 | 86 |
| 20 | 900 | 10 | 1.12 | 2.800 | 24 | 62 |
| 14 | 900 | 15 | 1.19 | 2.975 | 26 | 66 |
| 16 | 900 | 20 | 1.05 | 2.625 | 23 | 58 |
| 15 | 900 | 25 | 1 | 2.500 | 22 | 55 |
| 11 | 900 | 30 | 0.99 | 2.475 | 21 | 55 |
| 21 | 1000 | 3 | 0.94 | 2.350 | 20 | 52 |
| 22 | 1000 | 5 | 0.91 | 2.275 | 20 | 50 |
| 23 | 1000 | 10 | 0.92 | 2.300 | 20 | 51 |
| 18 | 1000 | 15 | 0.86 | 2.150 | 18 | 47 |

It will be noted from the above table (and the accompanying graph of FIG. 1) that certain combinations of time and temperature conditions provide an ash in which at least 60% by weight of the calcium carbonate present in the original sludge is converted to freely available calcium oxide. It will also be noted that, as a general trend, the amount of freely available calcium oxide present in the ash (expressed as a percentage of the amount of calcium carbonate present in the original sludge) increased in the early stages of the heating process and then subsequently decreased. This decrease is attributed to reaction of the calcium oxide with the silicate(s) present in the original sludge to form stable minerals (e.g. calcium di-silicate and calcium tri-aluminate which renders the calcium oxide "unavailable" for dissolution in the solution of the polyhydroxy compound.

In particular, it should be noted that combustion at 800° for periods of time in the range 10-30 minutes achieved greater than 90% by weight conversion of the original calcium carbonate to freely available calcium oxide (although there was a small decrease in the percentage in going from 10 minutes to 30 minutes combustion time). For combustion at 900° C., times in the range 5 to 10 minutes gave about 86% by weight conversion which fell to 66% after 15 minutes before subsequently decreasing to 58% after 20 minutes. As mentioned above, 100% conversion was obtained with combustion at 700° C. for 60 minutes.

It can be appreciated from the above figures that a combustion temperature of 800 to 900° C. provides for high conversion of the original calcium carbonate to free calcium oxide in acceptably short periods of time.

EXAMPLE 2

150 g of deinking sludge from Aylesford Newsprint was heated in a laboratory furnace under atmospheric conditions. An initial heating at 600° C. for 15 minutes served to dry and burn the organic components of the sludge. This was immediately followed by a second heating stage of 2 hours at 800° C. to ensure that all the calcium carbonate contained within the sludge was decomposed to calcium oxide. The resulting ash was then allowed to cool and then milled for 1 minute in a Janke & Kunkel mill.

XRD analysis of this PSA confirmed that all the calcium carbonate was decomposed and that no glassy complex silicates were formed. The PSA was of the following composition:

0% Calcium Carbonate

60% Lime (CaO & Ca(OH)$_2$)*

1% Quartz

39% amorphous metakaolin

Some hydration occurred as the hot ash cooled in a humid atmosphere.

30 g of the milled powder was added directly to 505 g of an aqueous solution containing 25% by weight of sorbitol.

The mixture was stirred for 30 minutes at ambient temperature using a helical stirrer. During this time the temperature of the mixture rose from 28° C. to 30° C.

The insoluble waste fraction was than removed by filtration followed by flocculation of suspended solids with Nalco 9908, a cationic polymer which was added to the solution with mixing. Any flocs present were separated from the solution by further filtration and the resulting clear filtrate found to contain approximately 2.8% by weight of dissolved lime [expressed as Ca(OH)$_2$]. This meant that an equivalent 10.7 g of free calcium oxide was extracted, representing approximately 36% of the total PSA.

A laboratory scale reactor vessel was charged with 458 g of this clear filtrate solution. The solution was stirred throughout the reaction using a helical stirrer at 7 rpm. Carbon dioxide was introduced into the solution at a rate between 3 and 6 liters/hour for a total of 38.6 minutes at which time the pH had dropped from an initial value to 11.59 to a pH of 10.4. The suspension of Synthetic Calcium Carbonate (SCC) formed by this reaction was removed by filtration and washed using a laboratory Buchner funnel. The resulting SCC product was then dried in a laboratory oven for 2 hours at 105° C.

The SCC powder had the following properties:

| | |
|---|---|
| Brightness (R457) | 97.1 |
| Yellowness (b*) | 1.3 |
| Mean particle size (D50) | 0.80 microns |
| Iron | 24 ppm |
| Manganese | 16 ppm |
| Einlehner Abrasion | <1 mg/100k revolutions |

The SCC recovered from this experiment was 22.8 g, equivalent to a yield of 78% compared to the original ash.

The insoluble waste fraction was also dried and had the following properties:

| | |
|---|---|
| Brightness (R457) | 74.5 |
| Yellowness (b*) | 6.1 |
| Mean particle size (D50) | 2.8 microns |

This analysis of the waste by XRD demonstrated that it is predominately metakaolin with an amorphous content of 83% compared with 39% for the PSA feed material. No free lime (neither calcium oxide nor hydroxide) was detected.

The yield of the insoluble waste was 15.2 g indicating that approximately 50-55% of the original ash can be utilised as a metakaolin by product.

EXAMPLE 3

Comparative

Paper Sludge Ash (PSA) from Aylesford Newsprint was characterised as having a brightness (R457) of 68% and a very broad particles size between 1 and 200 microns. This PSA has an approximate composition measured by XRD of:
25% Lime (CaO & $Ca(OH)_2$))
17% Calcium Carbonate ($CaCO_3$)
9% Gehlenite
16% Larnite
3% Calcium Aluminate
1% Quartz
28% amorphous metakaolin ($Al_2Si_2O_7$)

The following Table 2 demonstrates the equivalent amount of CaO (expressed as a percentage of the weight of the ash) provided by each of the above components.

TABLE 2

| Component | Equivalent CaO (%) |
|---|---|
| Lime (expressed as CaO) | 23.4 |
| $Ca(OH)_2$ | 1.6 |
| Calcium Carbonate | 9.7 |
| Gehlenite | 3.6 |
| Larnite | 10.8 |
| Calcium Aluminate | 1.3 |
| Quartz | — |
| Metakaolin | — |

Thus the ash contained 50.4% by weight equivalent lime which (for 100 g of ash) represents 90 g of calcium carbonate in the original sludge (i.e. (50.4/56)*100, where 56 represents the formula weight of calcium oxide and 100 represents the formula weight of calcium carbonate).

Of this 90 g of calcium carbonate, about 44 g were converted to free lime (CaO+$Ca(OH)_2$). Thus less than 50% by weight of calcium carbonate in the sludge had been converted to free lime.

176 g of PSA from Aylesford Newsprint was added directly (without pre-slaking) to 1000 g of an aqueous solution containing 25% by weight of sorbitol.

The mixture was stirred for 30 minutes at ambient temperature using a helical stirrer followed by a further 2 minutes intensive mixing with a Dispermat T45 disperser. During this time the temperature of the mixture rose from 26° C. to 39° C.

The insoluble waste fraction was then removed by filtration followed by flocculation of suspended solids with Nalco 9908, a cationic polymer which is added to the solution with mixing. Any flocs present were separated from the solution by further filtration and the resulting clear filtrate found to contain approximately 4.0% by weight of dissolved lime [expressed as $Ca(OH)_2$]. This meant that an equivalent 30 g of free calcium oxide was extracted, representing approximately 17% of the total PSA. This should be contrasted with the procedure of Example 2 (which is in accordance with the invention) and which provides for extraction of 36% of free calcium oxide based on the total PSA.

A laboratory scale reactor vessel was charged with 807 g of this clear filtrate solution. The solution was stirred throughout the reaction using a helical stirrer at 7 rpm. Carbon dioxide was introduced into the solution at a rate between 11 and 53 liters/hour for a total of 17.4 minutes at which time the pH had dropped from an initial value to 11.60 to a pH of 9.35. The suspension of Synthetic Calcium Carbonate (SCC) formed by this reaction was removed by filtration and washed using a laboratory Buchner funnel. The resulting SCC product was then dried in a laboratory oven for 2 hours at 105° C.

The SCC yield was 47.5 g which represents 27% of the PSA. This should be compared with the overall yield of 78% achieved in Example 2 above.

The SCC powder had the following properties:

| | |
|---|---|
| Brightness (R457) | 96.5 |
| Yellowness (b*) | 1.3 |
| Mean particle size (D50) | 0.81 microns |
| Iron | 35 ppm |
| Manganese | 14 ppm |
| Aluminium | 1040 ppm |
| Einlehner Abrasion | <1mg/100k revolutions |

The insoluble waste from this dissolution was also dried and had the following properties:

| | |
|---|---|
| Brightness (R457) | 65.0 |
| Yellowness (b*) | 3.1 |
| Mean particle size (D50) | 14 microns |

An XRD analysis of the insoluble waste confirmed that all the available lime was removed to give a composition of:
21% Calcium Carbonate
0% Lime (CaO & $Ca(OH)_2$)
9% Gehlenite
17% Larnite
1% Calcium Aluminate
1% Quartz
52% amorphous metakaolin It will be noted from the analysis that the metakaolin was contaminated with a substantial amount of calcium carbonate. Although this contamination is not as serious as contamination with lime (and does not weaken concrete) there is a lower percentage of active metakaolin in the product than is the case for the product of Example 2.

EXAMPLE 4

Reference 140 g of PSA from Aylesford Newsprint was added directly (without pre-slaking) to 2500 g of an aqueous solution containing 25% by weight of polyhydroxy compound. 30 seconds later, 35 g of virgin lime (CaO) was added also without pre-slaking. This blend represented the addition of an equal amount of free lime from both sources.

The mixture was stirred for 30 minutes at ambient temperature using a helical stirrer followed by a further 2 minutes intensive mixing with a Dispermat T45 disperser. The temperature of the solution rose from 20° C. to 30° C. during this time.

The insoluble waste fraction was removed and the remaining filtrate carbonated using the method already described in Example 3.

The resulting calcium carbonate product had an ISO brightness of 97.6, a yellowness (b* value) of 1.0 and a mean particle size of 1.0 microns. 110 g of calcium carbonate was obtained representing a yield of approximately 80% compared to the PSA feed.

EXAMPLE 5

Reference

The method described in Example 5 was repeated except that the addition weights were adjusted to represent a free lime contribution of 75% from the PSA and 25% from the virgin lime.

244 g of PSA from Aylesford Newsprint was added directly (without pre-slaking) to 2900 g of an aqueous solution containing 25% by weight of polyhydroxy compound. 30 seconds later, 20 g of virgin lime (CaO) was added also without pre-slaking.

The mixture was stirred for 30 minutes at ambient temperature using a helical stirrer followed by a further 2 minutes intensive mixing with a Dispermat T45 disperser. The temperature of the solution rose from 24° C. to 30° C. during this time.

The insoluble waste fraction was removed and the remaining filtrate carbonated using the method already described in Example 3.

The resulting calcium carbonate product had an ISO brightness of 97.8, a yellowness (b* value) of 1.2 and a mean particle size of 1.06 microns. 104 g of calcium carbonate was obtained representing a yield of approximately 43% compared to the PSA feed.

The invention claimed is:

1. A method of producing calcium carbonate from a waste sludge containing calcium carbonate and at least one silicate mineral, the method comprising the steps of:
   (i) incinerating the sludge to an ash in which at least 60% of the calcium carbonate present in the sludge is converted to free calcium oxide which is unreacted with the silicate mineral(s),
   (ii) optionally slaking the ash to convert at least a portion of the free calcium oxide therein to calcium hydroxide,
   (iii) treating either the ash from step (i) or the slaked ash from step (ii) with an aqueous solution of a polyhydroxy compound to provide a solution of dissolved calcium hydroxide comprising 10% to 35% by weight of dissolved polyhydroxy compound and 1% to 5% by weight of dissolved calcium hydroxide (expressed as $Ca(OH)_2$) and having a pH of at least 11.5,
   (iv) separating insoluble material from the solution of calcium ions obtained in step (iii),
   (v) dispersing carbon dioxide through the solution obtained from step (iv) so as to form a mixture containing calcium carbonate,
   (vi) terminating the dispersion of carbon dioxide before the pH falls below 9.5 and adding an alkaline reagent to maintain the pH for the product mixture at a value of at least 9.5, and
   (vii) separating the calcium carbonate produced in step (v).

2. A method as claimed in claim 1 wherein the insoluble material separated in step (iv) is substantially devoid of free calcium oxide.

3. A method as claimed in claim 2 wherein the sludge comprises kaolin and the insoluble solids separated in step (iv) comprise metakaolin substantially devoid of free lime.

4. A method as claimed in claim 1 wherein step (i) is effected to convert at least 80% of the calcium carbonate present in the sludge to calcium oxide which is unreacted with the silicate mineral(s) and which is freely available for dissolution in a procedure as defined in step (iii).

5. A method as claimed in claim 4 wherein step (i) is effected to convert at least 90% of the calcium carbonate present in the sludge to calcium oxide which is unreacted with the silicate mineral(s) and which is freely available for dissolution in a procedure as defined in step (iii).

6. A method as claimed in claim 1 wherein step (i) is effected at a temperature of 700° to 900° C.

7. A method as claimed in claim 6 which is effected to a temperature of 800° to 900°.

8. A method as claimed in claim 1 additionally comprises the step of:
   (i)(a) grinding the ash from step (i) to reduce its particle size.

9. A method as claimed in claim 8 wherein in the product of step (i)(a) at least 50% by weight of the ash particles have an equivalent spherical diameter of less than 20 µm.

10. A method as claimed in claim 1 wherein the ash from step (i) is subjected directly to step (iii) of the method.

11. A method as claimed in claim 1 wherein fresh calcium oxide is added to the solution of the polyhydroxy compound immediately after the ash in step (iii) of the process.

12. A method as claimed in claim 11 wherein the fresh calcium hydroxide is added to the solution of the polyhydroxy compound immediately after the ash.

13. A method as claimed in claim 1 wherein in step (v) dispersion of carbon dioxide is terminated prior to addition of the alkaline reagent.

14. A method as claimed in claim 1 wherein the solution produced in step (iii) comprises 20% to 30% by weight of dissolved polyhydroxy compound and 2 to 4.5% by weight of dissolved calcium hydroxide (expressed as $Ca(OH)_2$).

15. A method as claimed in claim 14 wherein the solution in step (iii) comprises 23% to 27% by weight of dissolved polyhydroxy compound and 3% to 4% by weight of dissolved calcium hydroxide (expressed as $Ca(OH)_2$).

16. A method as claimed in claim 15 wherein the solution in step (iii) comprises about 25% by weight of dissolved polyhydroxy compound and 3.4% to 3.9% by weight of dissolved calcium hydroxide (expressed as $Ca(OH)_2$).

17. A method as claimed in claim 1 wherein in step (v) of the method the amount of carbon dioxide dispersed through the solution is at least the stoichiometric amount required to convert the dissolved calcium to calcium carbonate.

18. A method as claimed in claim 1 wherein the sludge is a paper sludge.

19. A method as claimed in claim 18 wherein the sludge has been obtained by de-watering an aqueous suspension obtained as waste from the de-inking of recycled paper.

20. A method as claimed in claim 1 wherein in step (v) said dispersing initially produces a reduction in the pH of the mixture and subsequently produces a rise in the pH of the mixture and wherein in step (vi) the dispersion is terminated and the alkaline reagent is added after said rise in the pH of the mixture.

21. A method as claimed in claim 20 wherein during step (v) there is a transition from a first reaction phase to a second reaction phase marked by a decrease in the rate at which the reaction mixture is able to absorb carbon dioxide and wherein 70% to 85% by weight of the total amount of the stoichiometric amount of carbon dioxide is dispersed in the first reaction phase and the remainder is dispersed in the second reaction phase.

22. A method as claimed in claim 21 wherein in the first reaction phase the carbon dioxide is dispersed at the maximum rate at which it can be absorbed by the reaction mixture.

23. A method as claimed in claim 22 wherein in the second reaction phase the carbon dioxide is dispersed at the maximum rate at which it can be absorbed by the reaction mixture, said dispersion rate in the second reaction phase being less than in the first reaction phase.

24. A method as claimed in claim 20 wherein during step (v) there is a transition from a first reaction phase to a second reaction phase marked by formation of a gel and wherein 70% to 85% by weight of the total amount of the stoichiometric amount of carbon dioxide is dispersed in the first reaction phase and the remainder is dispersed in the second reaction phase.

25. A method as claimed in claim 24 wherein in the first reaction phase the carbon dioxide is dispersed at the maximum rate at which it can be absorbed by the reaction mixture.

26. A method as claimed in claim 25 wherein in the second reaction phase the carbon dioxide is dispersed at the maximum rate at which it can be absorbed by the reaction mixture, said dispersion rate in the second reaction phase being less than in the first reaction phase.

27. A method as claimed in claim 20 wherein in step (v) the rise in pH begins at a pH value of 10.2 to 10.8.

28. A method as claimed in claim 1 wherein the polyhydroxy compound is of the formula:

$$HOCH_2(CHOH)_nCH_2OH$$

wherein n is 1 to 6.

29. A method as claimed in claim 28 wherein the polyhydroxy compound is sorbitol.

30. A method of producing calcium carbonate from a waste sludge containing calcium carbonate and at least one silicate mineral, the method comprising the steps of:
(i) providing an ash which has been produced by incinerating a sludge containing calcium carbonate and at least one silicate material, wherein at least 60% of the calcium carbonate present in the sludge after incineration has been converted to free calcium oxide which is unreacted with the silicate mineral(s),
(ii) optionally slaking the ash to convert at least a portion of the free calcium oxide therein to calcium hydroxide,
(iii) treating either the ash from step (i) or the slaked ash from step (ii) with an aqueous solution of a polyhydroxy compound to provide a solution of dissolved calcium hydroxide comprising 10% to 35% by weight of dissolved polyhydroxy compound and 1% to 5% by weight of dissolved calcium hydroxide (expressed as $Ca(OH)_2$) and having a pH of at least 11.5,
(iv) separating insoluble material from the solution of calcium ions obtained in step (iii),
(v) dispersing carbon dioxide through the solution obtained from step (iv) so as to form a mixture containing calcium carbonate,
(vi) terminating the dispersion of carbon dioxide before the pH falls below 9 and adding an alkaline reagent to provide a pH for the product mixture of at least 10, and
(vii) separating the calcium carbonate produced in step (v).

31. A method as claimed in claim 30 wherein, in step (v) the alkaline agent provides a pH for the product mixture of at least 10.5.

32. A method as claimed in claim 30 wherein the insoluble material separated in step (iv) is substantially devoid of free calcium oxide.

33. A method as claimed in claim 32 wherein the sludge comprises kaolin and the insoluble solids separated in step (iv) comprise metakaolin substantially devoid of free lime.

34. A method of producing calcium carbonate from an ash which has been produced by incinerating a sludge containing calcium carbonate and at least one silicate mineral, wherein at least 60% of the calcium carbonate present in the sludge has been converted after incineration to free calcium oxide which is unreacted with the silicate mineral(s),
(i) optionally slaking the ash to convert at least a portion of the free calcium oxide therein to calcium hydroxide,
(ii) treating either the ash or the slaked ash from step (i) with an aqueous solution of a polyhydroxy compound to provide a solution of dissolved calcium hydroxide comprising 10% to 35% by weight of dissolved polyhydroxy compound and 1% to 5% by weight of dissolved calcium hydroxide (expressed as $Ca(OH)_2$) and having a pH of at least 11.5,
(iii) separating insoluble material from the solution of calcium ions obtained in step (ii),
(iv) dispersing carbon dioxide through the solution obtained from step (iii) so as to form a mixture containing calcium carbonate,
(v) terminating the dispersion of carbon dioxide before the pH falls below 9.5 and adding an alkaline reagent to maintain the pH for the product mixture at a value of at least 9.5, and
(vi) separating the calcium carbonate produced in step (v).

35. A method according to claim 34 which further comprises the production of metakaolin wherein the ash has been produced by incinerating a sludge containing calcium carbonate and kaolin, and wherein step (iii) comprises separating an insoluble material including metakaolin substantially devoid of free calcium oxide.

36. A method of producing calcium carbonate from an ash which has been produced by incinerating a sludge containing calcium carbonate and at least one silicate mineral, wherein at least 60% of the calcium carbonate present in the sludge has been converted after incineration to free calcium oxide which is unreacted with the silicate mineral(s),
(i) optionally slaking the ash to convert at least a portion of the free calcium oxide therein to calcium hydroxide,
(ii) treating either the ash or the slaked ash from step (i) with an aqueous solution of a polyhydroxy compound to provide a solution of dissolved calcium hydroxide comprising 10% to 35% by weight of dissolved polyhydroxy compound and 1% to 5% by weight of dissolved calcium hydroxide (expressed as $Ca(OH)_2$) and having a pH of at least 11.5, (iii) separating insoluble material from the solution of calcium ions obtained in step (ii),
(iv) dispersing carbon dioxide through the solution obtained from step (iii) so as to form a mixture containing calcium carbonate,
(v) terminating the dispersion of carbon dioxide before the pH falls below 9 and adding an alkaline reagent to maintain the pH for the product mixture at a value of at least 10 and
(vi) separating the calcium carbonate produced in step (v).

37. A method according to claim 36 which further comprises the production of metakaolin wherein the ash has been produced by incinerating a sludge containing calcium carbonate and kaolin, and wherein step (iii) further comprises separating an insoluble material includes metakaolin substantially devoid of free calcium oxide.

* * * * *